United States Patent [19]

Kaplan

[11] 4,109,247
[45] Aug. 22, 1978

[54] CLUTTER FREE COMMUNICATIONS RADAR

[75] Inventor: Gerald Stanley Kaplan, Lawrenceville, N.J.

[73] Assignee: RCA Corporation, New York, N.Y.

[21] Appl. No.: 769,337

[22] Filed: Feb. 16, 1977

Related U.S. Application Data

[63] Continuation of Ser. No. 593,120, Jul. 3, 1975, abandoned.

[51] Int. Cl.² .......................... G01S 9/56; G01S 9/58
[52] U.S. Cl. ............................... 343/6.5 R; 343/18 D
[58] Field of Search ............ 343/18 D, 6.5 SS, 6.5 R, 343/6.5 LC

[56] References Cited

U.S. PATENT DOCUMENTS

| 3,108,275 | 10/1963 | Chisholm | 343/18 D |
| 3,199,101 | 8/1965 | Hansel | 343/6.5 R X |
| 3,312,970 | 4/1967 | Bond | 343/6.5 R X |
| 3,644,883 | 2/1972 | Borman et al. | 343/6.5 LC X |
| 3,659,292 | 4/1972 | Martin | 343/6.5 R |
| 3,701,150 | 10/1972 | Dame | 343/6.5 SS |
| 3,772,668 | 11/1973 | Smith | 343/6.5 SS X |
| 4,001,822 | 1/1977 | Sterzer | 343/6.5 SS |

*Primary Examiner*—Malcolm F. Hubler
*Attorney, Agent, or Firm*—H. Christoffersen; Joseph D. Lazar; Raymond E. Smiley

[57] ABSTRACT

A clutter immune radar where the interrogating unit transmits a modulated interrogation signal to a remote unit, which radiates an information-bearing reply signal, in order to enable the interrogating unit to obtain remote unit information and range by the use of three bandpass filter channels where one bandpass filter bandwidth is equal to the sum of the other two bandwidths.

2 Claims, 2 Drawing Figures

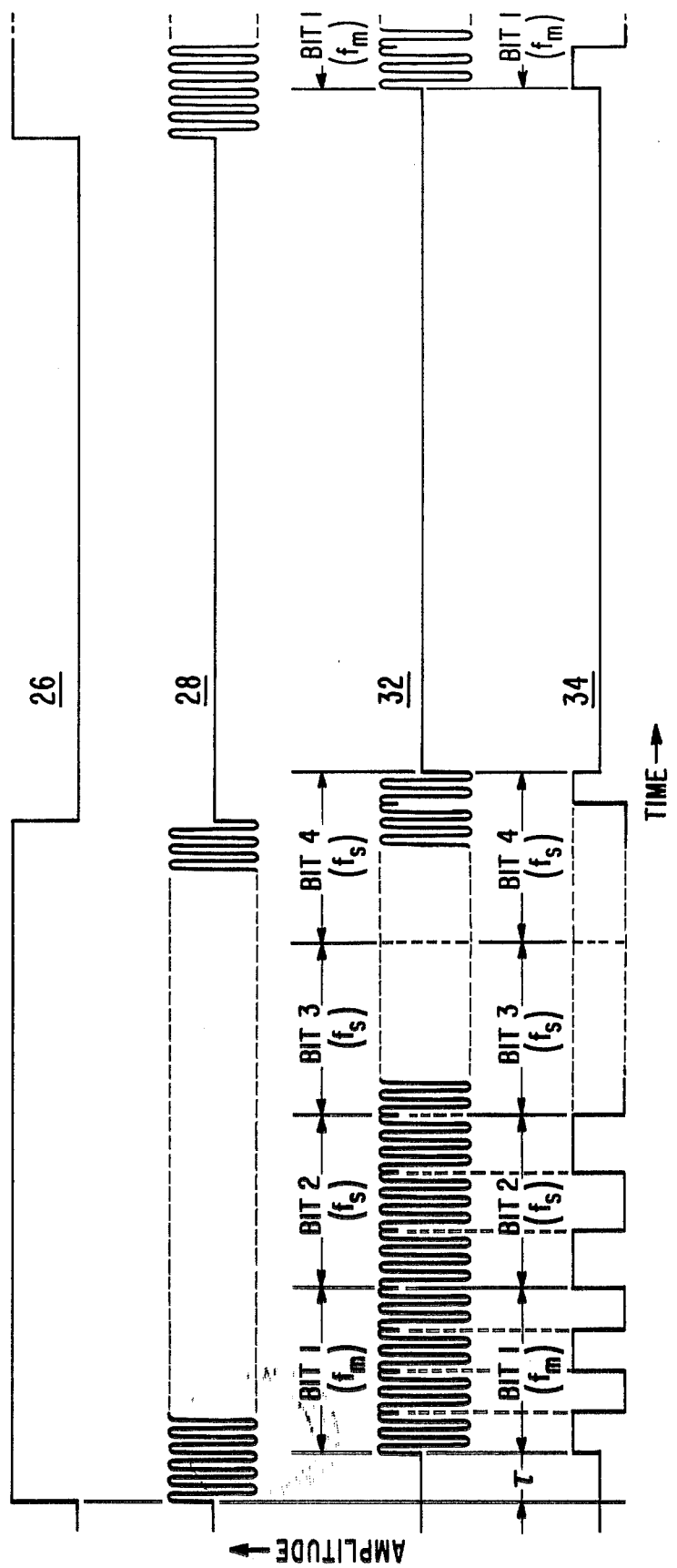

CLUTTER FREE COMMUNICATIONS RADAR

This is a continuation of application Ser. No. 593,120, filed 7/3/75, now abandoned.

BACKGROUND OF THE INVENTION

1. Field of the Invention

The present invention relates to a clutter immune radar.

2. Description of the Prior Art

In conventional radar detecting and ranging systems, an interrogation signal is transmitted toward a target and a skin-reflection is returned from the reflective surfaces of the target back to the interrogating unit. A problem, however, arises with such conventional systems in that skin-reflections from targets in critical relative positions are not discriminated from reflections from extraneous nonthreatening or "don't care" targets. Such skin reflectons from extraneous targets, are termed "clutter returns." Clutter returns are undesirable in that clutter can mask out returns from critical targets, or cause false alarms. For example, in the case of automotive collision avoidance radars, clutter returns can cause inopportune deployment of automatic braking or passenger resraints such as air bags.

Cooperative radar detecting and ranging systems are responsive only to specifically tagged targets which are capable of generating a reply signal that is in some way distinguishable or discriminated from the radar interrogaton signal and from skin reflections. Such cooperative radar systems, accordingly, are not subject to clutter. Such a cooperative system is described in U.S. Pat. No. Re.28,302 to H. Staras and J. Shefer dated Jan. 14, 1975. Another radar system, relatively immune to clutter, is descirbed in U.S. Pat. No. 4,003,049 entitled "Dual Mode Automobile collision Avoidance Radar" issued Jan. 11, 1977, to F. Sterzer G. S. Kaplan.

In some applications, it is desirable to incorporate in a single cooperative system, a ranging system and a communication system. For example, in navigation systems, it is desirable to range upon an identifiable reference buoy to determine thereby the exact absolute position of a vessel. It is noted, however, that provisions must be made to ensure that the communication signaling does not substantially interfere with the ranging process.

A combined ranging system and communications link for automotive vehicles is described in U.S. Pat. No. 4,001,822 entitled "An electronic License Plate for Motor Vehicles, " issued Jan. 4, 1977, to F. Sterzer. To ensure that the communication signaling does not substantially interfere with the ranging process, the Sterzer system utilizes a particular message format, including "a no-code" field wherein no additional modulation is imparted to the reply signal.

It is desirable to have a system wherein the communication signaling also acts as a discriminant, to thus aid, as opposed to merely not interfere with, the ranging process.

SUMMARY OF THE INVENTION

The present invention is directed to a ranging and detecting system. An interrogating unit transmits a modulated interrogation signal to a remote unit, which, in response thereto, radiates an information-bearing reply signal back to the interrogating unit. The reply signal is modulated in accordance with information at the remote unit. The interrogating unit also responds to skin-reflection from non-cooperating objects. The interrogating unit includes: first means for transmitting the modulated interrogation signal; second means for generating a difference signal having distinguishable components respectively representative of the reply signals and the skin reflection, wherein the components representative of the reply signals have characteristics respectively indicative of the information and the range; third means for extracting the information from the reply signal; and fourth means, responsive only to those components of the difference signal having the characteristic indicative of the information, for determining the range.

BRIEF DESCRIPTION OF THE DRAWING

FIG. 2 depicts the waveform of various signals associated with the ranging system of FIG. 1.

DETAILED DESCRIPTION OF THE PREFERRED EMBODIMENT

Figure 1:
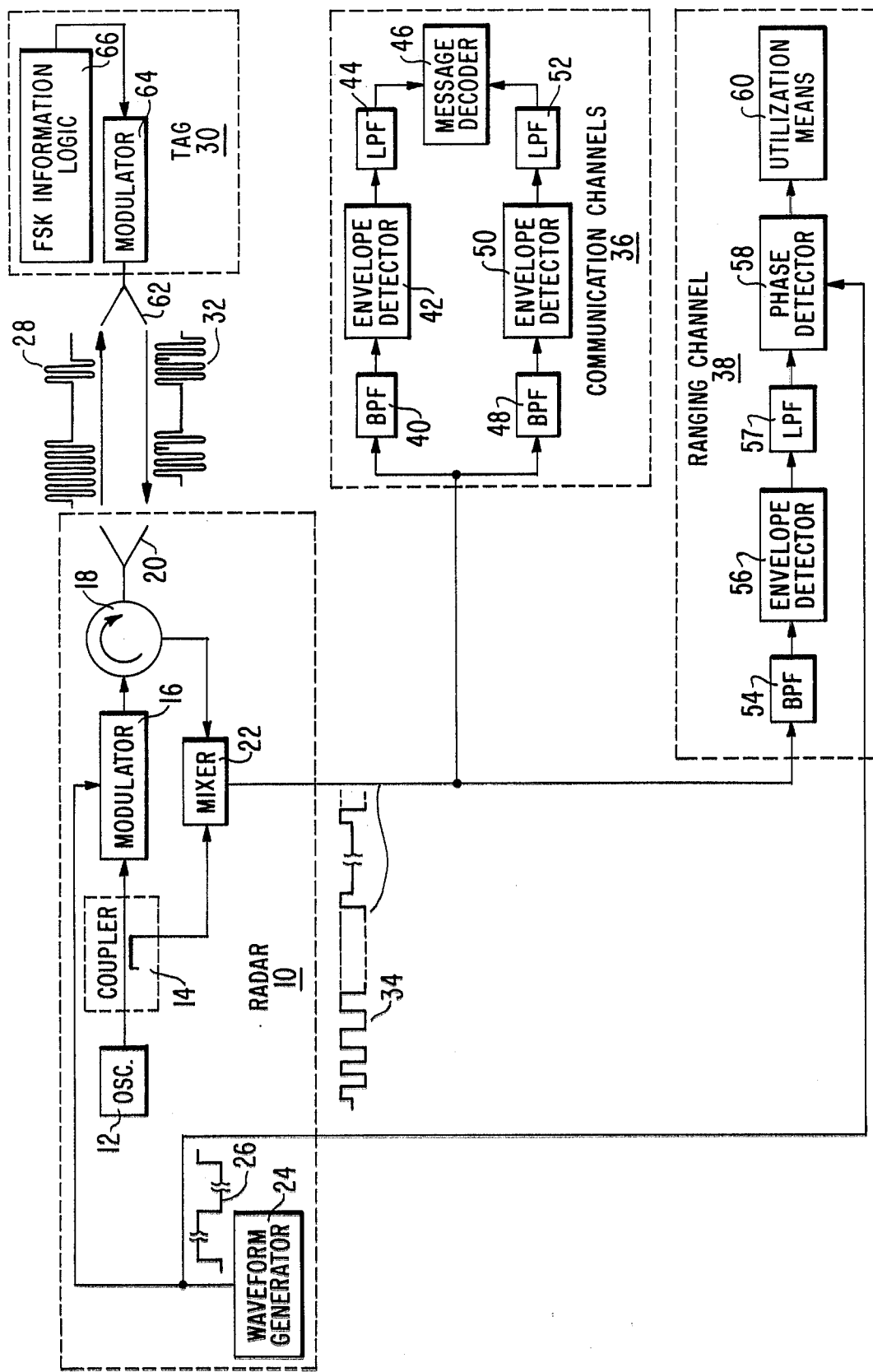
FIG. 1 shows a block diagram of a ranging system in accordance with the present invention.

Referring to FIG. 1, there is seen an interrogating station, in accordance with the present invention, including a homodyne radar 10. Homodyne radar 10 comprises conventional components, including an oscillator 12, a directional coupler 14, a modulator 16, a circulator 18, a directional antenna network 20, a mixer 22, and a waveform generator 24. Oscillator 12, typically a TEO, generates a continuous wave output signal, which is applied to modulator 16. A sample of the output signal of oscillator 12 is also applied to mixer 22 by means of directional coupler 14. Modulator 16 is also receptive of a modulation waveform 26, suitably a square wave, generated by waveform generator 24. Modulator 16 amplitude modulates the continuous wave output signal of oscillator 12 with the modulation waveform 26, to produce an amplitude modulated output signal which is routed by circulator 18 to antenna 20. Antenna 20 radiates the amplitude modulated signal as an interrogation signal 28.

Interrogation signal 28 is suitably directed to impinge upon a cooperating remote unit or tag 30, which, in response to interrogation signal 28, radiates a further modulated reply signal 32. Tag 30 comprises suitably a directional antenna network 62, connected to a phase modulator 64, which is in turn driven by suitable frequency shift keying (FSK) information logic 66. Such a tag is described in U.S. Pat. No. 3,984,835, entitled "A Homodyne Communication System" issued Oct. 5, 1976, to G. S. Kaplan and A. D. Ritzie. Briefly, FSK information logic 66 generates a FSK signal having, alternatively, one of two predetermined frequencies, i.e., a mark frequency, or a space frequency, in accordance with, for example, a preset message comprising a sequence, at a given bit rate, of binary code bits. Phase modulator 64 responds to interrogation signal 28 and phase modulates such interrogation signal 28 in accordance with the FSK signal to generate reply signal 32. Further description of reply signal 32 will hereinafter be given.

The above-mentioned U.S. Pat. No. 3,984,835 also describes a technique which is termed "phase diversity", a technique to negate the effects of undesirable relative-position-related amplitude nulls in the output signal of mixer 22. Such phase diversity involves further alteration of the phase of reply signal 32, typically periodically at a predetermined "diversity rate." The principle of phase diversity may be embodied in the present invention in accordance with the teachings of the above-mentioned U.S. Pat. No. 3,984,835.

Reply signal 32 is received by antenna 20 of homodyne radar 10 and is routed by circulator 18 to mixer 22. Mixer 22 generates an output signal of a form that will depend on the signals received by antenna 20. A more detailed discussion of this signal will be given hereafter. For the present purposes consider only a component 34 of the output signal representative of reply signals 32 from cooperative tag 30. Such an output signal of mixer 22 is applied to communication channels, generally indicated by numeral 36, and a ranging channel, generally indicated by numeral 38.

Communication channels 36 comprise a first channel associated with the predetermined "mark" frequency, including: a band pass filter (BPF) 40 center-tuned to the mark frequency, an envelope detector 42, and a low pass filter 44. BPF 40 is connected to envelope detector 42, the output signals of which are passed through low pass filter 44 to a suitable message decoder 46. Communication channels 36 further comprise a second channel associated with the predetermined "space" frequency, including: a band pass filter 48 center-tuned to the space frequency, and an envelope detector 50. The output signals of envelope detector 50 are passed through low pass filter 52 to message decoder 46.

Message decoder 46 suitably comprises a comparator, receptive of the low pass filter output signals, a plurality of threshold detectors, respectively receptive of the output signal of low pass filter 44 and the output signal of low pass filter 52, and a suitable digital processor, receptive of the output of the comparator and threshold detectors. For a more detailed description of communication channels 36 and message decoder 46, reference is made to the abovementioned U.S. Pat. No. 3,984,835 to Kaplan and Ritzie.

As noted above, mixer (22) output signal is also applied to ranging channel 38. Ranging channel 38 includes a band pass filter (BPF) 54 tuned to pass both mark and space frequency signals, an envelope detector 56, a low pass filter 57, and a two-input terminal phase detector 58. The outuput of BPF 54 is applied to an envelope detector 56, the output terminal of which is connected through low pass filter 57 to one input terminal of phase detector 58. The second input terminal of phase detector 58 is receptive of waveform 26 from waveform generator 24. A suitable phase detector 58 is commercially available in a portion of an integrated circuit such as RCA-CD4046 COS/MOS identified as a "Micro-power phase locked loop." Output signals from phase detector 58 are applied to suitable utilization means 60 such as, for example, a read-out device, an automatic braking device, or a passenger restraint.

The operation of the clutter free communication radar depicted in FIG. 1 is now addressed with reference to FIGS. 1 and 2. Oscillator 12 generates a continuous wave (cw) RF signal of predetermined frequency. The cw signal is amplitude modulated with waveform 26 by modulator 16 and, is radiated by antenna 20 as interrogation signal 28. Such an amplitude modulated interrogation signal 28 is illustrated in FIG. 2, for the case of a square wave waveform 26. Interrogation signal 28 impinges upon tag 30, which, in response thereto, generates a modulated reply signal 32. Reply signal 32 is radiated back to antenna 20 of radar 10. As noted above, tag 30 phase modulates reply signal 32 with mark or space frequency tones in accordance with binary data.

As explained in detail in the abovementioned U.S. Pat. No. 3,984,835 to Kaplan and Ritzie, the phase of reply signal 32 is shifted, alternately, for example, by 0° and 180°, at a periodic rate equal to the respective mark and space frequencies. The waveform of reply signal 32 is shown in FIG. 2, wherefrom it is seen that reply signal 32 has the form of a signal at the predetermined frequency of oscillator 12, amplitude modulated in accordance with squarewave waveform 26, having bits wherein the phase of the signal is periodically inverted, alternatively, at the mark or space frequency. Reply signal 32 is also delayed in time with respect to the interrogation signal 28 by an amount ($\tau$) in accordance with the range between radar 10 and the target. Such round trip delay $\tau$, as it is known in the art, is equal to twice the range divided by the velocity of light.

It is noted that the frequencies of the respective waveforms as depicted in FIG. 2 are chosen for ease of illustration. The predetermined frequency of the output signal of oscillator 12, hereinafter referred to as the carrier frequency, is typically in the vicinity of 10 GHz. The mark and space frequencies are typically chosen to have values, e.g., 7 and 9 MHz, respectively, much lower than the carrier frequency (10 GHz) but much greater than the bit rate of the information, (typically 750 Kbps), and the frequency of modulation waveform 26 (typically 75 KHz). The mark and space frequencies and the frequency separation therebetween are further chosen to be different from any anticipated doppler shifts in the frequency of reply signal 32 as caused by relative movements between tag 30 and the radar 10. Further, though not shown in FIG. 2, where phase diversity is used, the diversity rate is typically chosen to have a value (typically 1,700 Hz) greater than the bit rate of the data, but less than the mark and space frequencies.

It should be appreciated that instead of an FSK system, any encoding scheme utilizing a plurality of different frequencies or tones may be utilized in the practice of the present invention with an appropriate change in the number at channels in communications channels 36. It should also be appreciated that on-off keying of a single tone may be utilized in the present invention with the communications channel 36 being modified to include only a single channel, including a single band pass filter, envelope detector, and low pass filter.

As noted above, when reply signal 32 is received by antenna 20 in radar 10 and routed to mixer 22, it is mixed with a sample of the cw signal from oscillator 12. Mixer 22 generates an output signal having a component 34, representative of the reply signal 32 from tag 30. Mixer 22 output component 34 is illustrated in FIG. 2 for the exemplary case of a squarewave waveform 26. The mixer 22 output signal including component 34 is applied to both communication channels 36 and ranging channel 38.

As known in the art, the mixer 22 output signal is the product of the absolute values of the respective amplitudes of the input signals to the mixer, further multiplied by the cosine of the relative phase therebetween. With respect to component 34, such input signals are the sample of the cw signal from oscillator 12 and reply signal 32. As shown in FIG. 2, a mixer output signal component 34 has the form of waveform 26 superimposed on sequential bits of, alternatively, a mark or space frequency square wave. Mixer output signal component 34, thus, manifests both the amplitude modulation impressed on interrogation signal 28 by modulator 16 and the phase modulation impressed on reply signal by tag 30. Such phase modulation is utilized for communication purposes, as will be explained. The amplitude modulation by modulator 16 is utilized to determine the round-trip delay, τ to thereby measure the range, as will also be explained.

Mixer 22 will also generate output signals having components representative of skin-reflection returns from non-tagged targets (neither shown in the drawing), or from the reflective surfaces of cooperating targets or both. Such skin-reflection signals resemble interrogation signal 28, delayed in time by an amount equal to the round-trip-delay τ in accordance with the relative distance between the non-tagged target and radar 10. Accordingly, the skin-reflection components of the output signal of mixer 22 will take the form of a signal at the frequency of modulation waveform 26, amplitude modulated in accordance with the cosine of the relative phase of the carrier frequency signals, and delayed in time with respect to modulation waveform 26 in accordance with the round-trip-delay τ.

As noted above, mixer output signal component 34 is applied to the respective channels of communication channels 36. BPFs 40 and 48 are respectively center-tuned to the mark and space frequencies, and thus, respectively function to pass through the respective channels only those bits of the mixer output signal component 34 containing the respective associated frequency. Envelope detectors 42 and 50 and low pass filters 44 and 52 serve to detect the envelope of the signals respectively passed by BPFs 40 and 48. Low pass filters 44 and 52, by use of appropriate time constants, further serve in effect to average the amplitude of the envelope of the signals over the duration of the respective bits. Message decoder 46 compares the output signals from low pass filters 44 and 52 to determine the presence of mark or space frequency signals and, accordingly, the message carried on reply signal 32.

For a more detailed description of the operation of communication channels 36 and message decoder 48, reference is again made to the above-mentioned U.S. Pat. No. 3,984,835 to Kaplan and Ritzie.

As noted above, mixer output signal component 34 is also applied to ranging channel 38. Bandpass filter 54 passes only those signals within a predetermined bandwidth containing the mark and space frequencies and accordingly essentially has the combined bandwidth of the BPFs 40 and 48. Thus, the components of the mixer output signal representative of skin-reflections from untagged targets not bearing the phase modulation discriminant as per the FSK signaling, are rejected by bandpass filter 54. Envelope detector 56 and low pass filter 57 serve to remove the FSK signaling, and in effect, reconstruct the amplitude modulation waveform 26 as carried on reply signal 32. Phase detector 58 serves to detect the phase difference made between the instantaneous waveform 26 and the amplitude modulation on the return signal 32, to thereby determine the round-trip-delay τ. The output signal of phase detector 58 is accordingly applied to suitable utilization means 60, for example, to develop a range readout or sound an alarm, or to act as a control signal for an automatic braking device or passenger restraint.

It should be appreciated that other forms of radar, for example, a frequency-modulated continuous-wave (FM-CW) radar may be utilized in the practice of the present invention. In an FM-CW radar, as known in the art, the interrogation signal is "frequency swept," and, accordingly, the round-trip-delay is manifested in a frequency shift between the reply signal and the instantaneous interrogation signal. Those components of the output signal of mixer (22), representative of reply signals from cooperating targets have the form of a signal having a frequency equal to the frequency shift due to round-trip-delay, superimposed on sequential bits of mark or space frequency signals.

Such a signal component would be applied, as in the above-described amplitude modulated radar (FIG. 1), to communication channels 36 and to ranging channel 38. Ranging channel 38, as depicted in FIG. 1 would be modified, however, such that the output signals of low pass filter 57 would be applied to a suitable processor, such as means for detecting the frequency of the signals, rather than to the phase detector 58 shown. The output signals of the processor would in turn drive a suitable utilization means 60.

For a more detailed description of an FM-CW radar utilizing such a ranging process reference is made to the above-modified copending application Ser. No. 593,016 "Dual Mode Automobile Collision Avoidance Radar" by F. Sterzer and G. S. Kaplan, now U.S. Pat. No. 4,003,049.

It should be noted that in the practice of the invention utilizing FM-CW radar, the mark and space frequencies and the frequency separation therebetween are typically chosen to be greater than the frequency shift representative of the maximum range of the FM-CW radar plus any anticipated Doppler shifts.

It should be appreciated from the foregoing description of the preferred embodiment that the present invention provides for a particularly advantageous clutter free communications radar. This is accomplished by utilizing the communication signaling as a discriminant against clutter. It will be understood that the above description is of illustrative embodiments of the present invention, and the invention is not limited to the specific forms shown. Modification may be made in the design and arrangement of the elements without departing from the spirit of the invention, as will be apparent to those skilled in the art.

What is claimed is:

1. In a system for detecting the presence and range of a cooperating remote unit from an interrogating station in an environment of non-cooperating objects, said interrogating station transmitting a modulated interrogation signal at one particular carrier frequency for reception at said remote unit, said interrogation signal being modulated in accordance with a predetermined waveform, said remote unit, in response to said interrogation signal, radiating back to said interrogating unit at said one particular carrier frequency an information bearing reply signal, said reply signal being modulated in accordance with any one of a plurality of signals having differing predetermined frequencies, each of said predetermined frequencies being representative of a given value of said information at said remote unit, said non-cooperating objects, in response to said interrogation signal, radiating back to said interrogating station, skin-reflections of said interrogation signal, said interrogating station comprising:

first means for transmitting said modulated interrogation signal, including means for generating a sample signal indicative of said one particular carrier frequency;

second means comprising a mixer, responsive to said reply signals, said skin-reflections, and said sample signal, for generating a difference signal having distinguishable components respectively representative of said reply signals from said remote unit and said skin-reflections from said non-cooperating objects;

said component representative of said reply signals having characteristics respectively indicative of said information and the range between said remote unit and said interrogating station;

third means comprising a plurality of channels each of which includes a bandpass filter (BPF) receptive of said difference signal, each center-tuned to a respective one of said predetermined frequencies, said third means also comprising means receptive of the respective output signals of said BPFs for determining the presence of the respective predetermined frequencies for extracting thereby said information from said reply signal; and fourth means comprising an additional BPF receptive of said difference signal for passing a signal having a band of frequencies essentially equal to the total bandwidth of all of said respective third means BPFs and further comprising means cooperating with said additional BPF for detecting said characteristic indicative of said range for determining the range between said remote unit and said interrogating station.

2. The interrogating station of claim 1, wherein:

said first means comprises;

an oscillator for generating a continuous wave (CW) signal at a predetermined carrier frequency;

an amplitude modulator, receptive of said CW signal and responsive to a signal having a predetermined waveform, for modulating the amplitude of said CW signal in accordance with said predetermined waveform;

coupler means receptive of said CW signal for providing a sample of said CW signal; and antenna means, receptive of said amplitude modulated signal for, transmitting said amplitude modulated signal as said interrogation signal; and, further;

wherein said detecting means of said fourth means comprises a phase detector responsive to a signal indicative of said additional BPF output signal and said predetermined modulation waveform.

* * * * *